(12) United States Patent
Mills

(10) Patent No.: US 8,231,089 B2
(45) Date of Patent: Jul. 31, 2012

(54) SUCTION PLATE OR BOWL HOLDER

(75) Inventor: Jesse Russell Mills, Salt Lake City, UT (US)

(73) Assignee: Lil Diner, LLC, Salt Lake City, UT (US)

( * ) Notice: Subject to any disclaimer, the term of this patent is extended or adjusted under 35 U.S.C. 154(b) by 483 days.

(21) Appl. No.: 12/637,617

(22) Filed: Dec. 14, 2009

(65) Prior Publication Data

US 2010/0239407 A1 Sep. 23, 2010

Related U.S. Application Data

(60) Provisional application No. 61/210,262, filed on Mar. 18, 2009, provisional application No. 61/274,787, filed on Aug. 21, 2009.

(51) Int. Cl.
*A45D 42/14* (2006.01)

(52) U.S. Cl. .................. 248/206.3; 248/683; 248/205.5; 248/309.3; 248/363; 248/362; 224/559; 206/829

(58) Field of Classification Search .................. 248/683, 248/205.5, 206.2, 206.3, 206.4, 309.3, 363, 248/362; 224/559; 206/829

See application file for complete search history.

(56) References Cited

U.S. PATENT DOCUMENTS

| | | | |
|---|---|---|---|
| 2,099,635 A | 11/1937 | Toniolo | |
| 2,517,018 A | 7/1945 | Nicholson | |
| 2,740,545 A * | 4/1956 | Bates | ........................... 215/394 |
| 2,850,079 A | 9/1958 | Prushnok et al. | |
| 2,910,264 A * | 10/1959 | Lindenberger | ................ 248/362 |
| 4,662,676 A | 5/1987 | Havelock | |
| 4,756,497 A * | 7/1988 | Lan | ........................... 248/205.9 |
| 4,908,066 A | 3/1990 | Taylor et al. | |
| 5,053,262 A | 10/1991 | Kerr | |
| 5,641,140 A | 6/1997 | Sorenson | |
| 5,842,671 A | 12/1998 | Gibbs | |
| 5,996,957 A | 12/1999 | Kurtz | |
| 6,065,604 A | 5/2000 | Storck | |
| 6,216,605 B1 | 4/2001 | Chapman | |

(Continued)

FOREIGN PATENT DOCUMENTS

JP 06-000230 U 1/1994

(Continued)

OTHER PUBLICATIONS

International Search Report mailed Nov. 30, 2010 as received in International Patent Application No. PCT/US2010/027625.

(Continued)

*Primary Examiner* — Amy Sterling
*Assistant Examiner* — Todd M Epps
(74) *Attorney, Agent, or Firm* — Maschoff Gilmore & Israelsen

(57) ABSTRACT

A plate holder can include: a skirt having a top member and one or more side walls forming a cavity therebetween when the one or more side walls are resting on a substrate with the top member oriented away from the substrate; a base coupled with the skirt and located within the cavity, the base having one or more top suction device receptacles and one or more bottom suction device receptacles; one or more top suction devices coupled with the one or more top suction device receptacles such that the top suction device is oriented away from the substrate; and one or more bottom suction devices coupled with the one or more top suction device receptacles such that the bottom suction device is oriented toward the substrate.

20 Claims, 10 Drawing Sheets

U.S. PATENT DOCUMENTS

| | | | |
|---|---|---|---|
| 6,497,394 B1 * | 12/2002 | Dunchock | 248/205.8 |
| 6,581,541 B2 | 6/2003 | Hollinger | |
| 6,637,614 B2 | 10/2003 | Bergkvist | |
| 6,746,735 B2 | 6/2004 | Snedeker | |
| 7,303,172 B2 | 12/2007 | Rich | |
| 7,931,245 B2 * | 4/2011 | Mills et al. | 248/231.71 |
| 8,186,642 B2 * | 5/2012 | Weiss-Vons | 248/683 |
| 2006/0006181 A1 | 1/2006 | Rich | |
| 2008/0245947 A1 | 10/2008 | Webb et al. | |

FOREIGN PATENT DOCUMENTS

| | | |
|---|---|---|
| JP | 09-206195 A | 8/1997 |
| WO | 02/005995 A1 | 7/2002 |
| WO | 2006/048637 A1 | 5/2006 |

OTHER PUBLICATIONS

U.S. Appl. No. 12/221,393, filed Aug. 1, 2008, Jesse Russell Mills, et al.

* cited by examiner

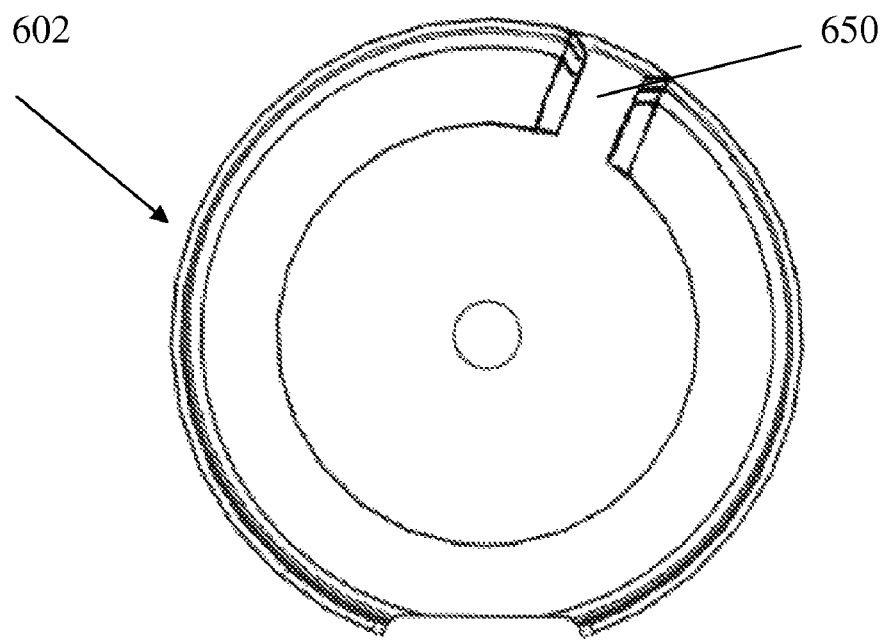
FIG. 6A
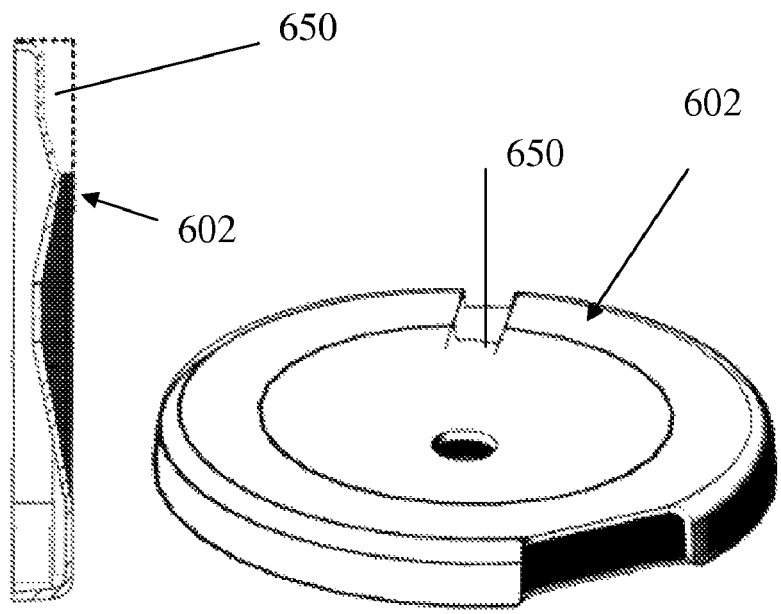
FIG. 6B          FIG. 6C

SUCTION PLATE OR BOWL HOLDER

CROSS-REFERENCE TO RELATED APPLICATIONS

This application claims benefit of U.S. Provisional Application Ser. No. 61/210,262, filed on Mar. 18, 2009 and U.S. Provisional Application Ser. No. 61/274,787, filed on Aug. 21, 2009, which provisional applications are incorporated herein by specific reference in their entirety.

BACKGROUND

There are various situations where food dishes or other kitchenware articles can fall, spill or otherwise cause a mess because they are not securely held during use. For example, a young child having a meal in a restaurant may spill the contents of a plate by moving the plate around or may knock a dish off of the table or other substrate. The problems of securely retaining kitchenware are not restricted only to small children. Adults with motor control deficiencies may also have trouble using unsecured kitchenware. In restaurants and similar settings, preventing spillage from a plate or a bowl is a challenge for many parents and caregivers, who often resort to holding a child's plate by hand to keep it from being tipped, spilled, or knocked off. Alternatively, dishes and bowls are not used at all and food for children is placed directly on the table or other substrate or on a paper placemat provided by the restaurant, which is not a sanitary solution.

In addition, eating in a moving environment such as in a vehicle, watercraft, aircraft, or other moving environments using conventional unsecured dishes without holders may lead to spills or breakage.

There have been various attempts to design plates and placemats that can reduce the likelihood of food spillage; however, many of these designs are not suitable or other substrate for use with an existing kitchenware or may require cleansing between uses. Also, one previous plate holder included a mechanism that was large and bulky which required assembly of the plate holder prior to use. Additionally, bulky devices can be difficult to carry and a burden to use, especially when a child can access and actuate the mechanism.

Examples of some references that relate to preventing spillage of plate or bowl contents as well as general mess prevention can be found in the following the contents of which are incorporated herein: U.S. Pat. No. 7,303,172; U.S. Pat. No. 6,746,735; U.S. Pat. No. 5,053,262; U.S. Pat. No. 6,637,614; U.S. Pat. No. 6,581,541; and U.S. application Ser. No. 12/221,393.

BRIEF SUMMARY OF THE INVENTION

Generally, a plate holder can be formed into a ready to use format that can be retrieved, attached to a table or other substrate, and then receive a plate.

In one embodiment, a plate holder can include: a skirt having a top member and one or more side walls forming a cavity therebetween when the one or more side walls are resting on a substrate with the top member oriented away from the substrate; a base coupled with the skirt and located within the cavity, the base having one or more top suction device receptacles and one or more bottom suction device receptacles; one or more top suction devices coupled with the one or more top suction device receptacles such that the top suction device is oriented away from the substrate; and one or more bottom suction devices coupled with the one or more top suction device receptacles such that the bottom suction device is oriented toward the substrate.

In one embodiment, the top and/or bottom suction device receptacles can be configured for removably receiving suction devices. For example, the one or more top or bottom suction devices can include a stem configured for removably coupling with the suction device receptacles of the base which has apertures configured for receiving the suction device stems.

In one embodiment, the skirt can be removably coupled to the base through one or more top suction devices.

In one embodiment, the skirt can include one or more access ports. The access ports can be configured to provide access to the bottom suction devices when attached to a substrate, such as a table.

In one embodiment, one or more of the suction devices can have an elongate release tab. The elongate release tab can have a length that extends radially past the edge of a recess in the top member or past the one or more side walls. Also, a groove formed into the top member of the skirt in a radial orientation.

In one embodiment, a top surface of the top member can have a recess configured for receiving the one or more top suction cups such that a dinnerware rests on the top member when attached to the one or more top suction cups.

In one embodiment, the base can include a structural reinforcement member.

In one embodiment, the plate holder can include any of a variety of features, such as: a recess in the top surface of the skirt; an aperture at a bottom portion of the recess; the base having one top suction device receptacle and two or more bottom suction device receptacles; two or more bottom suction devices removably coupled with the two or more bottom suction device receptacles; and one top suction device having a stem that extends through the aperture and is removably coupled with the top suction device receptacle.

In one embodiment, the present invention can include a method for releasably securing kitchenware to a substrate, such as a table. The method can include: providing a plate holder as described herein; attaching the plate holder by suction of the one or more bottom suction devices to a substrate; and attaching the plate holder by suction of the one or more top suction devices to a kitchenware. Optionally, the providing can include assembling the plate holder. Such assembling can include one or more of: inserting a stem of a top suction cup through an aperture in the skirt; coupling the stem of a top suction device with a top suction device receptacle of the base; or coupling the stems of bottom suction devices with bottom suction device receptacles of the base.

In one embodiment, the plate holder can be in a ready to use configuration upon being provided. Accordingly, the method can include retrieving the plate holder in the ready to use configuration from a bag.

In one embodiment, the method can include releasing the seal between a top suction device and the kitchenware and/or between a bottom suction device and the substrate.

In one embodiment, the method can include positioning or rotating the skirt such that an access port of the skirt is positioned opposite of a subject.

In one embodiment, the present invention can include a plate holder kit that has: a skirt having a top member with a recess and one or more side walls forming a cavity therebetween when the one or more side walls are resting on a substrate with the top member oriented away from the substrate, the skirt having an aperture in the recess; a base having one or more top suction device receptacles and one or more bottom suction device receptacles; one or more top suction devices having a stem configured to be passed through the aperture of the skirt and to be removably coupled with the one or more top suction device receptacles such that the top suction device is oriented away from the substrate; and one or more bottom suction devices configured to be removably coupled with the one or more top suction device receptacles such that the bottom suction device is oriented toward the substrate. The kit can also include any of the following: a single top suction device; two or more bottom suction devices; one or more access ports formed in the top member; one or more top suction devices including an elongate release tab; the one or more suction device receptacles being equally spaced apart; a groove in the top member configured for receiving an elongate release tab of a suction device; the base having a structural reinforcing member; or the suction device receptacles being holes having a large portion that can receive a suction device stem and a small portion that can snap onto the suction device stem.

These and other embodiments and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 6A illustrates a top view of a skirt of a plate holder.

FIG. 6B illustrates a side view of the skirt of FIG. 6A.

FIG. 6C illustrates a perspective view of the skirt of FIG. 6A.

DETAILED DESCRIPTION

Figure 1A:
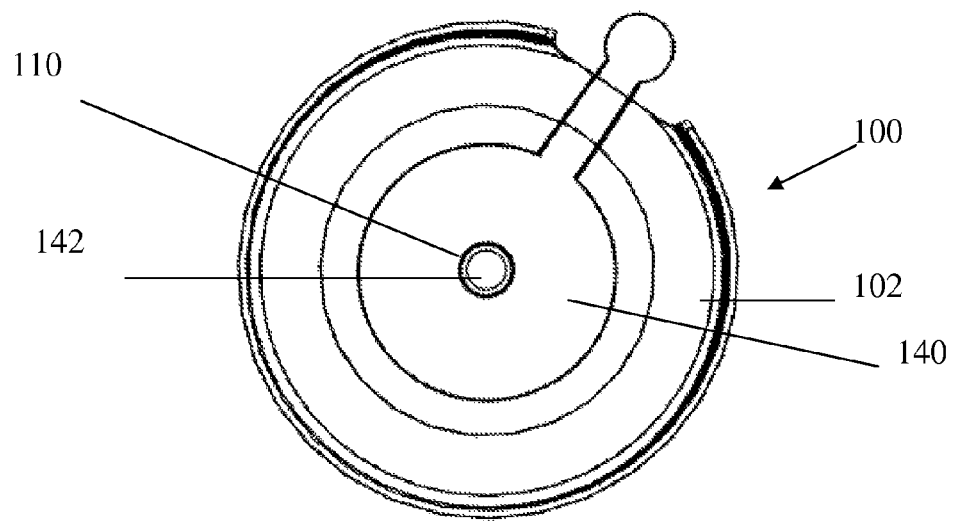
FIG. 1A illustrates a top view of the plate holder.
Figure 1B:
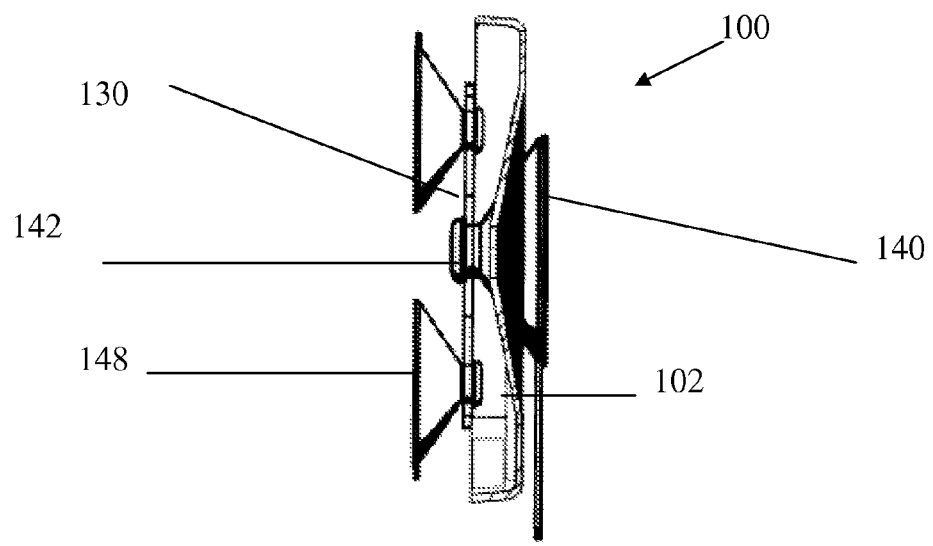
FIG. 1B illustrates a side view of the plate holder of FIG. 1A.
Figure 1C:
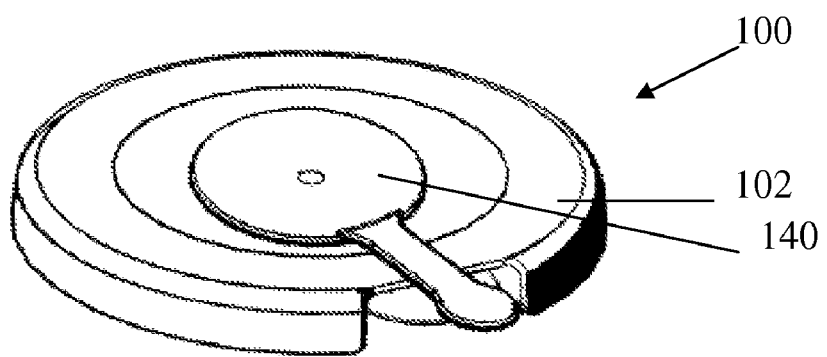
FIG. 1C illustrates a perspective view of the plate holder of FIG. 1A.
Figure 1D:
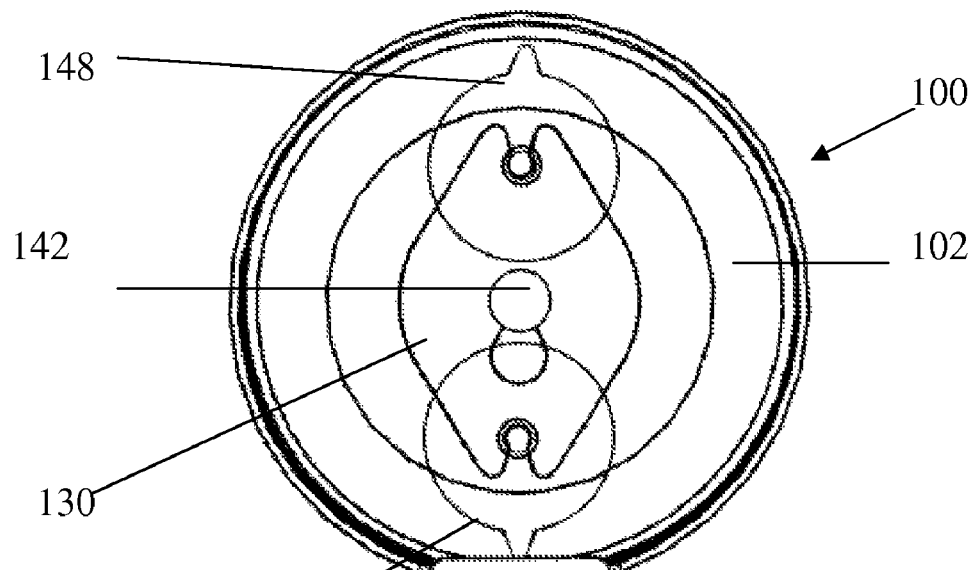
FIG. 1D illustrates a bottom view of the plate holder of FIG. 1A.
Figure 1E:
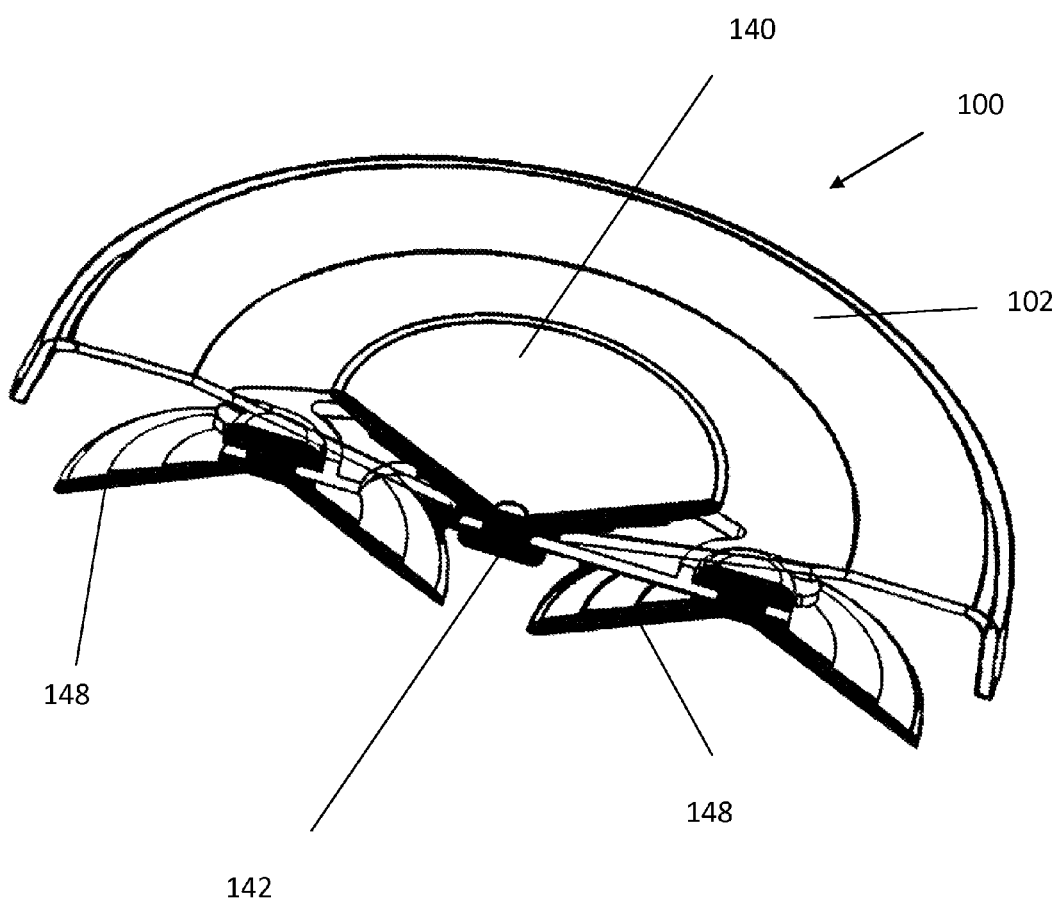
FIG. 1E illustrates a cut-away perspective view of the plate holder of FIG. 1A.

The present invention provides an improved plate holder for use with various types of table tops and other surfaces and by allowing for the parent to use the restaurant dish and bowls or any type of dinnerware, so that it does not require any cleaning of dishes or trays after use. The improved plate holder is more durable, more compact, and more easily portable by having a compact, low profile design. The low profile design can be in a discus or Frisbee-like cross-sectional shape that has a plate-receiving surface that is round or any polygonal shape. The size can be configured relative to dinnerware and to various purses or child care bags (e.g., diaper bags) so that the improved plate holder can be retained therein in a ready to use configuration. This allows a care provider to retrieve the improved plate holder in a ready to use configuration so that it can be attached to a table or other substrate and then receive the dinnerware so that the articles do not move with respect to each other.

With the improved plate holder, when going to a restaurant, a patron does not need to bring a bowl or plate to avoid a mess, but can now bring the plate holder which can attach to a smooth bottom plate or bowl with a top suction cup and attach to a table or other substrate with bottom one or more suction cups. Any dinnerware having a bottom capable of receiving a suction cup for attachment can be used with the improved plate holder described herein.

The improved plate holder is unique for several reasons. With the present invention, nearly any smooth bottom dish can be used so there is no dish to clean or carry home. Since no part of the plate holder touches any food, it will require only minimal cleaning, such as wiping off with a disposable baby wipe from the diaper bag, when used in public or otherwise away from a cleaning facility. The plate holder can be used for multiple meals or at different times without being sanitized or cleansed in between. However, the plate holder can be sanitized by any conventional dishwasher and with most cleaning soaps.

While some designs attempted to use suction as a means of keeping a plate on the table or other substrate, none have approached the use of suction in the same way as the present plate holder by using suction to retain a plate to the plate holder and to retain the plate holder on a table or other substrate. The present plate holder is different because the suction device is not physical integrated with the dish itself in an effort to hold the entire dish structure to the table or other substrate, but instead the suction is used as a means of attaching various types of dishes to many different types of table surfaces. The plate holder is functional in any dining environment that has a plate or dish with a relatively solid portion on the bottom that can receive suction. It is likely that this type of dish can be found in almost every restaurant, home, hospital and any other dining environment. The dish can be made of nearly any material, as long as the bottom side of the dish that receives the top suction cup is smooth and non-porous The improved plate holder provides a ready to use device that can quickly and without assembly be retrieved and directly attached to a table or other substrate and then receive a plate. This is a streamlined and faster approach to keeping a young child, handicapped person's or outdoor enthusiast dish on the table or other substrate that allows the user the convenience and ease of using any type of smooth bottom sided plate or dish, that does not require additional materials, that does not create the potential of damaging property, that does not require frequent cleaning, and that has the level of hold necessary to ensure the child will not be able to remove the dish.

The ready to use plate holder easily and firmly attaches by way of suction to tables, tray, placemat, and various other structures and by the use of suction can hold most plates and bowls. The plate holder can include a suction cup receiving member (e.g., a base or flat piece capable of receiving two or more suction cups that point in opposite directions) that holds the suction cups on each side, herein referred to as the base. The base can be configured with two or more receptacles for receiving suction cups in opposite orientations or in any direction that stabilizes the opposing suction cup(s). This can include a top side of the base having a receptacle for receiving a suction cup sized for receiving a plate, which can be in the center. The base can include a bottom side having one or more receptacles for receiving a suction cup sized for being attached to a table surface or the like. Advantageously, the top and bottom suction cups can be arranged to provide stability to a plate received therein, which can include a top and bottom suction cup being aligned or multiple bottom suction cups being positioned around the top suction cup.

The plate holder can optionally include a skirt. The skirt can be attached to the base and/or to any of the suction cups. For example, the skirt can be attached to the top suction cup above where the suction cup attaches to the base. Also, the skirt can curve downward such that the top suction cup sits at the same level of the outer edge of the top of the skirt. This design serves to balance the plate on the skirt and to reduce or quiet any noise resulting from movement of the plate or a child hitting the plate.

An embodiment of a plate holder is illustrated and described herein to include a single top suction cup, a skirt, a base, and two bottom suction cups. Some illustrated embodiments include additional features such as a suction cup release tab and a skirt having a receptacle to receive the release tab. However, it should be recognized that one or more top suction cups can be configured to retain a kitchenware, and one or more bottom suction cups can be configured to attach the plate holder to a table, tray, or other eating surface.

FIGS. 1A-1E show an assembled plate holder 100. The plate holder is shown to include a skirt 102, a top suction cup 140 for attaching to the plate and the top suction stem 142 has a length sufficient to go all the way through the skirt 102 and the base 130. This allows the skirt 102 and base 130 to be slid over the suction cup stem 142. The skirt 102 and base 130 can include round holes 110 to receive the suction cup 140 stem 142 or the holes 110 can include a keyhole fixture that allows the suction cup stem to snap into the skirt 102 and/or base 130.

The plate holder also includes bottom suction cups 148 which attach to the base 130 opposite of the top suction cup 140. However, the bottom suction cups 148 do not extend through the skirt 102.

Figure 2A:
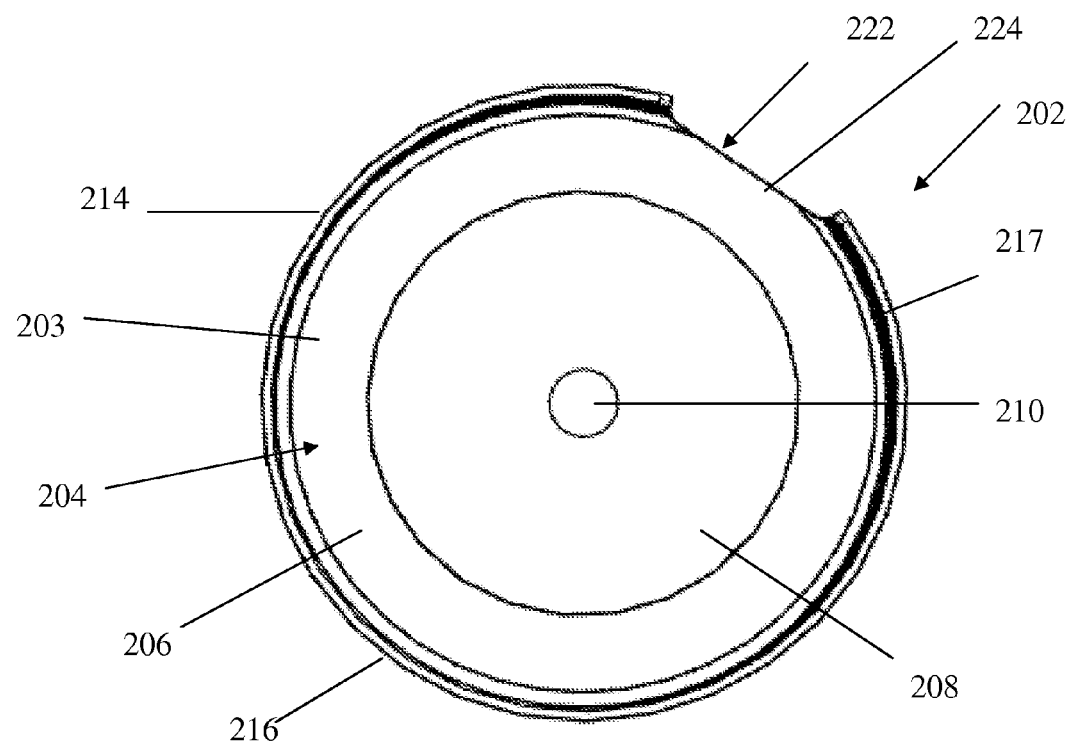
FIG. 2A illustrates a top view of the skirt of a plate holder.
Figure 2B:
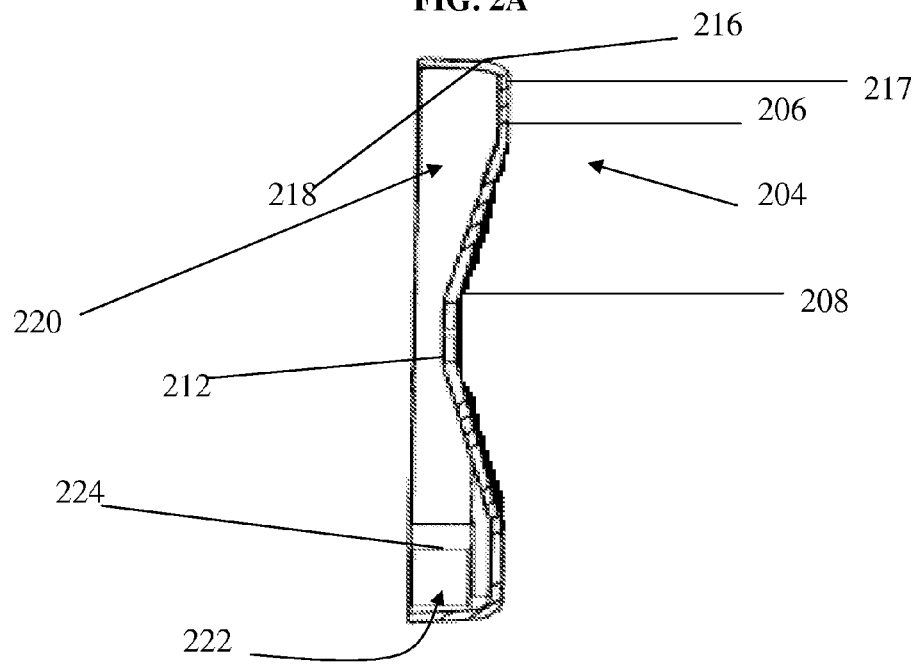
FIG. 2B illustrates a side view of the skirt of FIG. 2A.
Figure 2C:
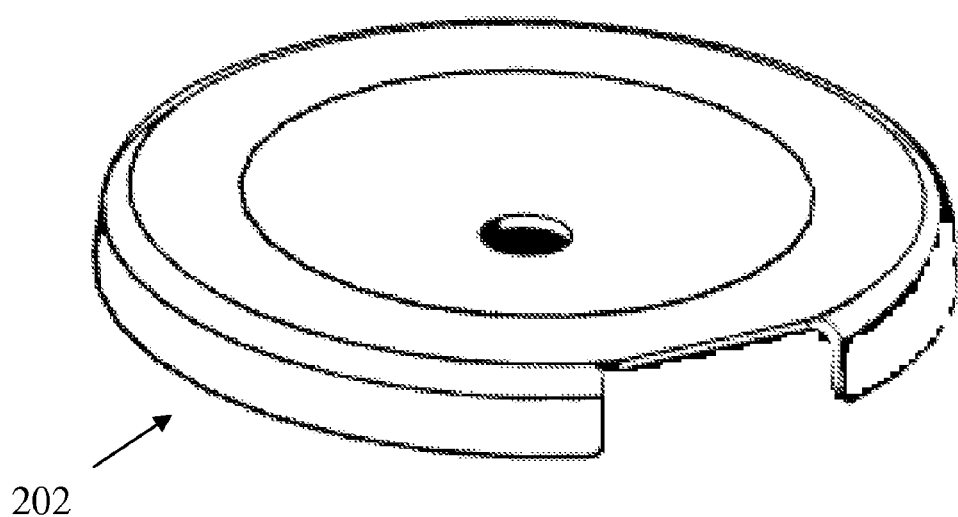
FIG. 2C illustrates a perspective view of the skirt of FIG. 2A.

FIGS. 2A-2C show an embodiment of a skirt 202 of a portable dinnerware holder. FIG. 2A provides a top view of the skirt 202. The skirt 202 can include a body 203 having a top surface 204 having an outer edge 206 that provides a perimeter to a downward sloping recess 208. At the bottom of the recess 208 is an aperture 210 extending through the skirt 202, and which is configured for receiving a dinnerware mount. The recess 208 is configured for receiving the bottom of a dinnerware when mounted onto the dinnerware mount that extends upward through the aperture 210 or for providing a space for the dinnerware mount to receive the dinnerware which rests on the top surface 204.

FIG. 2B shows a side view of the skirt 202 of FIG. 2A. This view illustrates the bottom surface 212 opposite of the top surface 204 and which has the aperture 210. The body 203 also includes a side 214 that extends around the outer edge 206 such that the top surface 204 is connected to an outer side surface 216 and the bottom surface 212 is connected to an inner side surface 218. The connections can be facilitated by a structural feature that provides strength and mechanical integrity for maintaining a flat outer edge 206 and recess 208 with a flexible, shape-returning elasticity. The body 203 and side 214 cooperate so as to form a cavity 220 between the space defined by the bottom surface 212 and side surface 218 when the skirt 202 is placed upon a table or other substrate.

FIGS. 2A-2C show that the skirt 202 is configured with an access port 222 at a location on the edge 206 of the skirt 202 that provides access into the cavity 220. The access port 222 can be defined by a port surface 224. The port surface 224 can intersect or traverse through any portion or amount of the skirt 202 such as the top surface 204, outer edge 206, recess 208, bottom surface 212, side 214, outer side surface 216, and/or inner side surface 218.

Figure 3A:
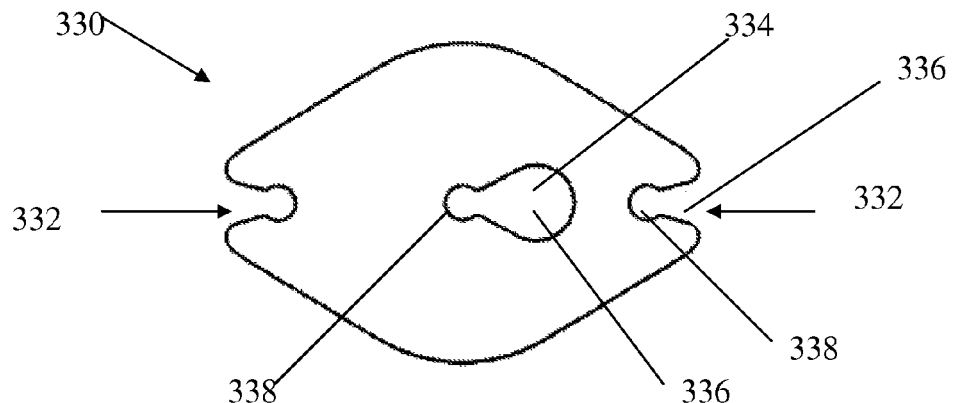
FIG. 3A illustrates a top view of a base or attachment member.
Figure 3B:
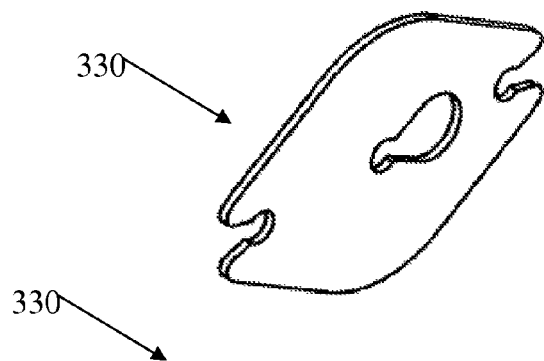
FIG. 3B illustrates a perspective of the base of FIG. 3A.
Figure 3C:
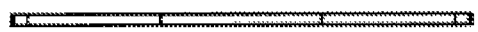
FIG. 3C illustrates a side view of the base of FIG. 3A.

FIGS. 3A-3C show an embodiment of the base 330, which is configured to function as a receiver and have attachment mechanisms for the suction cups. The attachments mechanisms can be represented by the shaped slots 332 at each end, and can receive the suction cups by snapping into the shaped slots 332. Also, a shaped hole 334 is positioned near the center of the base 330. The shaped slots 332 and shaped hole 334 can include suction cup receiving holes 336 that can receive a large diameter suction cup stem and groove receiving notches 338 that can receive small diameter grooves in the suction cup stem.

The base 330 defines the location of the suction cups with respect to a center hole 334. The base 330 has two features: the end attachment features 332 for the bottom suction cups to snap into; and a center hole 334 for the top suction cup to snap into. The base 330 is configured such that the suction cups are removable. Also, the base has an additional feature of providing space so that the base 330 for the bottom suction cups to extend far enough to suction to a table or other substrate with the sides of the skirt touching the surface of the table or other substrate to provide stability.

Figure 3D:
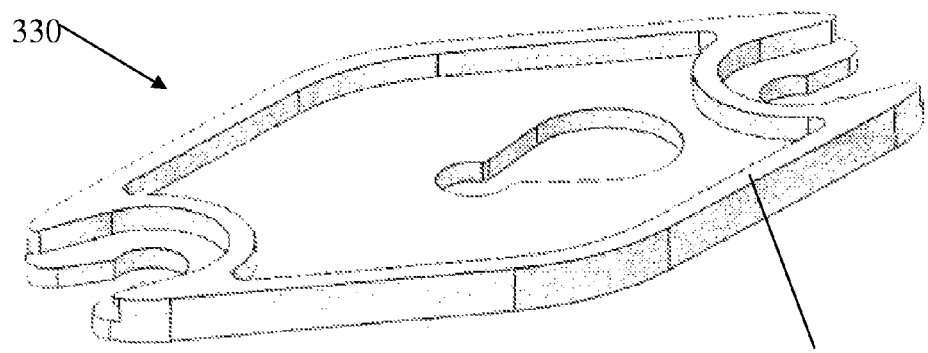
FIG. 3D illustrates another embodiment of a base.

FIG. 3D shows the base 330 having a structural reinforcing member 339, which is illustrated as a rib around the periphery of the base 330. In one instance it can be important to include the ridge so that the stems of the suction cups can be received therein and so that the components seat together better. Also, having a structural reinforcing member 339 and allow for the thickness to be modulated to be thinner without losing structural integrity.

Figure 4A:
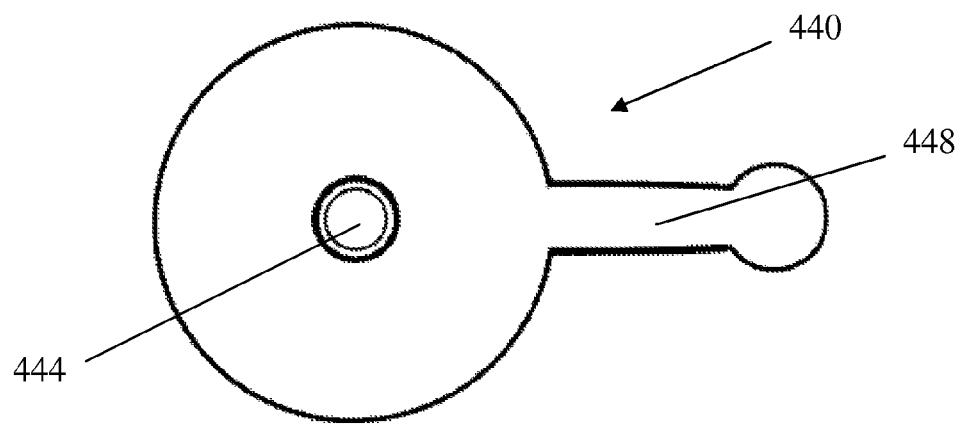
FIG. 4A illustrates an embodiment of a suction cup with a release arm.
Figure 4B:
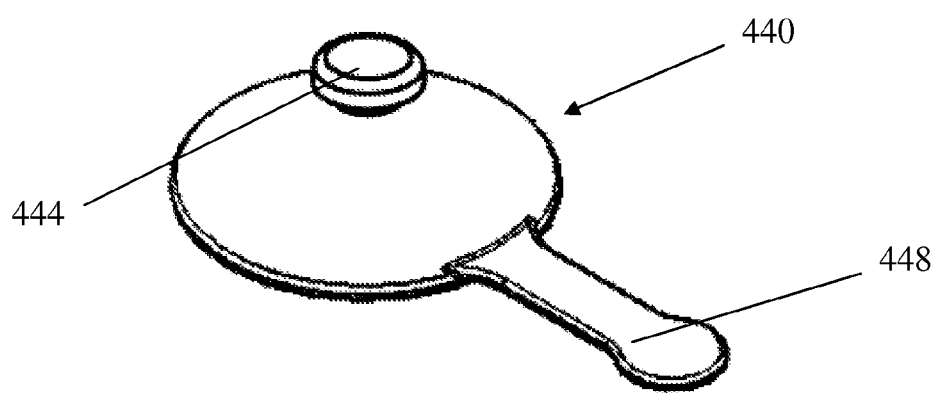
FIG. 4B illustrates a perspective view of the suction cup of FIG. 4A.
Figure 4C:
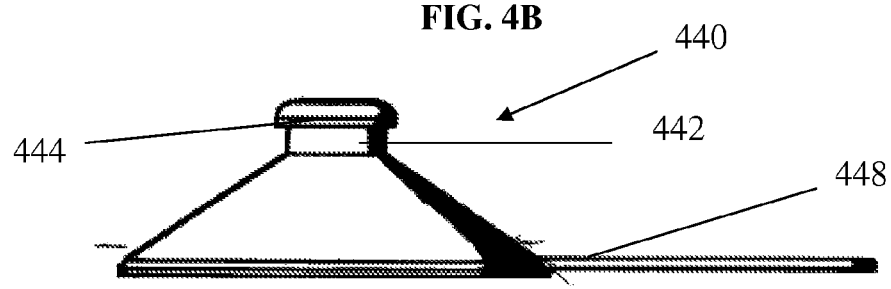
FIG. 4C illustrates a side view of the suction cup of FIG. 4A.
Figure 5A:
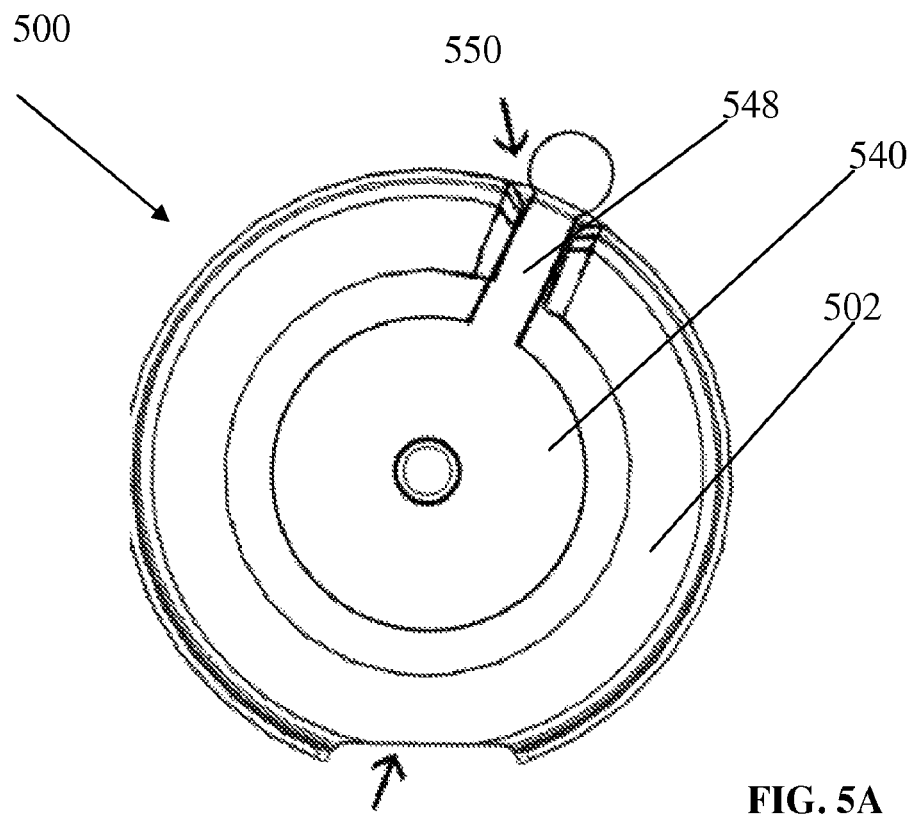
FIG. 5A illustrates a top view of the plate holder.
Figure 5B:
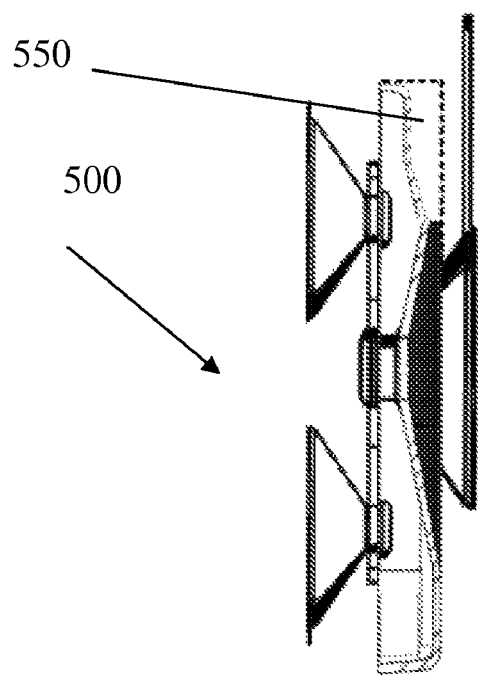
FIG. 5B illustrates a side view of the plate holder of FIG. 5A.
Figure 5C:
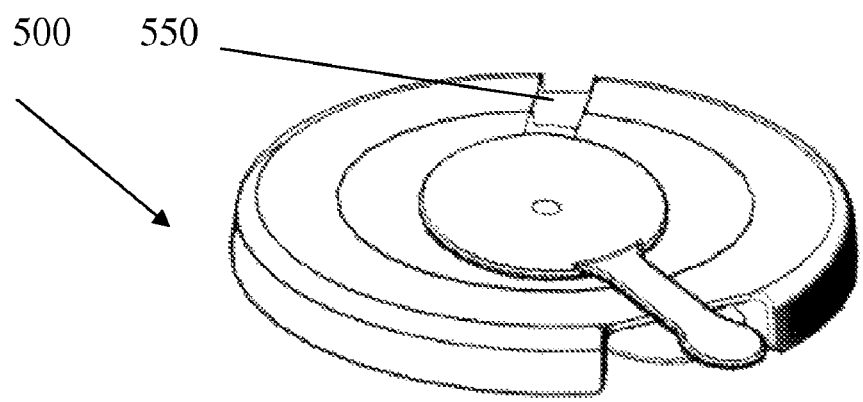
FIG. 5C illustrates a perspective view of the plate holder of FIG. 5A.
Figure 5D:
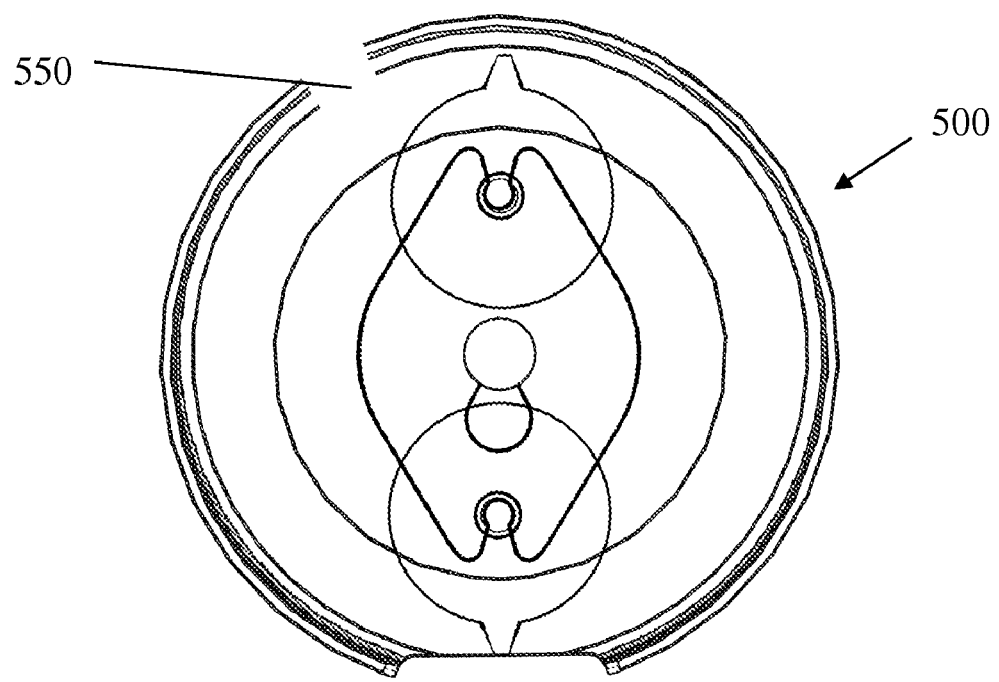
FIG. 5D illustrates a bottom view of the plate holder of FIG. 5A.

FIGS. 4A-4C illustrate an embodiment of a suction cup 440. The suction cup stem 442 has a length sufficient to attach to the suction cup 440 to a plate with enough length to also pass through the skirt and the base.

FIGS. 4A-4C also show an embodiment of a suction cup that has a release tab 448. The release tab 448 is optional as the suction cup 440 can be released from the plate by manual force or with a finger or utensil. However, the release tab 448 can be useful for making the detachment process much easier and convenient because the parent or user does not need to find a utensil or risk injuring their finger. While the release tab 448 is optional, it can provide a quick release mechanism for releasing the seal between the table or other substrate and plate, and such a quick release mechanism satisfies a need for increased portability and usability.

Also shown is the suction cup including a stem cap 444 that has a larger diameter of the stem 442. While not shown, the stem 442 can also include a groove that can be received into the skirt and/or base.

FIGS. 5A-5D show a plate holder 500 that includes a skirt 502 that has a receiving member 550 for receiving the suction cup 540 release tab 548. The receiving member can be a groove that extends from the center of the skirt to the outer edge so that the release tab can fit within the receiving member and not interfere with the plate seating into the skirt. For example, the receiving member can have a convex, groove or a cutout where the plate can rest stably and securely While the receiving member 550 can be positioned at any portion on the skirt, it can be advantageous to be opposite or substantially opposite of the access port 522. This positioning can provide increased balance and stability.

FIGS. 6A-6B illustrate a skirt 602 that includes a receiving member 650 for a release tab of a suction cup. The receiving member 650 is configured as a groove or a slot formed into the skirt. The receiving member 650 can have various shapes and sizes so long as to accommodate a release tab. Also, the release tab and receiving member 650 can be dimensioned so that there is sufficient room for the release tab to be actuated such as pulled down to break the seal between the suction cup and the plate.

The access ports shown in the figures have a size that allows for a finger, spoon, knife or fork to fit therethrough to reach into the cavity formed by the skirt and a table or other substrate. The access port allows for access to the bottom suction cups, so that the seal can be broken manually. For example, a knife can be inserted through the access port and slid between the suction cup and the table or other substrate to break the seal. Also, the suction cup can include a release tab similar to the top suction cup that can be actuated to release the suction cup seal. On the other hand, the top suction cup can be configured without a release tab and can be released or have it seal with a plate broken with a finger or a knife.

The configuration of the skirt and base mounting on the suction cup stem allows for the skirt to be rotated so that the access port can be positioned opposite of the child so that the child does not have immediate access to the bottom suction cups. Also, the rotatable configuration allows for multiple bottom suction cups to be released by releasing one bottom suction cup and then rotating the skirt to access the next suction cup.

Alternatively, the skirt could have multiple access ports so as to have one access port for each bottom suction cup. In some instances the skirt may lose its structural integrity when multiple access ports are formed into the skirt, however, structural ribs or other structural members can be used to provide additional support. For example, circular structural ribs can be identified at positions on the skirt by any of the circles in the figures. In another example, the access port can be ribbed. However, a skirt with just one access port can be favorable because of superior balance and structural integrity, where multiple access ports can lead to the skirt being flimsy. Also, a single access port can be positioned opposite of the child. The skirt should be configured to have structural integrity sufficient to retain a plate.

The skirt can be a flat circular piece with or without a recess and with a small hole in the center and a folded over lip around the outer edge of the skirt. The skirt can be configured to assist in balance of any attached kitchenware and to dampen sound if dish is struck forming a skirt. For example, the skirt can have a diameter of from 4 inches to a foot or longer, which is large enough to support most dishes but small enough to be easily transported. As such, the skirt can range in diameter from about 4 inches to 12 inches, or from 5 inches to 10 inches, or about 6 inches. Other sizes of skirt may be used. The skirt can prevent the kitchenware from moving around too much while the child is eating, and also absorbs the energy produced when a child pounds on the dish, which would otherwise cause a loud noise as the dish met the table or other substrate. It also reduces the ability of a child to accidentally or intentionally stick his fingers under the dish and try to remove it.

In one embodiment, the skirt shape can include a handle or a handle can be positioned at the side for easy portability.

The skirt can be formed of a structurally sound material that can have elasticity so that there can be slight deformation to accommodate the plate and the table or other substrate, but returns to shape after use. For example, the skirt can be formed of a low density polyethylene, MITS, Chemlon, acrylic, other hard or soft plastic-like materials, silicone, rubber or other similar polymeric material. Also, various metals, alloys or composites could be configured to have this property. Additionally, the flexibility and/or elasticity of the skirt can allow for slight deformation to accommodate the various ridges or other protruding patterns that maybe present on the plate, and allows for a substantial universal fit to many different types of plates and bowls. For example, many restaurant plates and bowls have a ridge protruding downward around the bottom, and the flexibility and elasticity of the skirt deforms to receive such downward protruding ridges and provide stability to the plate.

The skirt can be configured into a variety of shapes from triangles, squares, circles, polygons, and other shapes.

The skirt can function to isolate the top suction cup from the person eating, and can keep their fingers from inadvertently detaching the top suction cup. It may also prevent the person eating from getting his finger caught between the plate and skirt.

Additionally, the flexibility and elasticity of the skirt can function for sound deafening. When a plate is attached to the plate holder, the skirt contacts the plate with an elastic material that can absorb sound vibrations. Such a configuration can reduce sounds attributed to a child hitting the kitchenware with silverware.

Also, the bottom suction cups can function similarly with respect to the table or structure pushing against the side wall of the skirt so that the skirt sits firmly and securely on the table or structure. This allows the plate holder to sit flat and flush with the table or structure, and creates a support structure underneath the plate between the plate and the table or structure.

The plate holder can also be configured to be a cup or glass holder so that a drinking cup, such as one with a straw, can be attached to a table or other substrate in a similar manner. This allows the user to create an instant cup holder for all types of beverages in restaurants, hospitals and outdoor recreational situations.

The plate holder can also be configured with a skirt that has different shapes. Various shapes can be used such as round, oval, square, triangle, or other polygon or other shape and retain the functionality and features described herein.

The plate holder has a low profile and does not protrude excessively into the table or structure area and so that the plate holder is easily portable and useable.

The plate holder can be attached to many different structures, including but not limited to restaurant tables, plastic picnic tables, metal tables, glass tables, laminate tables, wood tables, polymer tables, stroller trays, highchair trays and many others. Also, the plate holder can be attached to any surface suitable for receiving a suction cup.

Similarly, the plate holder can receive dinnerware as well as many other objects that can be attached to a suction cup. For example, any substantially flat surface that can be stuck to a suction cup can be held to a substrate with the invention described herein. Various types of trays, clipboards, toys, educational materials, books, or the like that include at least one suction cup receiving surface can be attached to a substrate with the present invention.

In one embodiment, the plate holder can be used to attach two suction cup receiving surfaces together. As such, two objects each having a suction cup receiving surface can be attached together through the invention described herein.

While only one top suction cup is shown and two bottom suction cups are shown in the figures, any number of top suction cups can be used by adding additional holes in the skirt and base and modulating the size of the suction cups as needed. Similarly, one or more bottom suction cups can be used even though the embodiment of the plate holder shows two bottom suction cups. The top suction cup can be the same size, smaller, or larger then the bottom suction cups. The suction cups can range between about 0.25 inches to 8 inches in diameter, more preferably from about 0.5 to 4 inches or from about 1 inch to 3 inches in diameter.

The suction cup is large enough to provide the necessary suction to hold on to most plates and bowls. The suction of the suction cup is easily released by an adult, but securely holds a plate or another article so that it is not easily spilled or dislodged by a child, a handicapped person, by wind, or by movement of the structure. The suction cup can attach to a plate by pushing the plate atop the suction cup until it sticks. Nearly all types of dishes can be attached to the plate holder, including but not limited to glass bowls and plates, ceramic bowls and plates, plastic bowls and plates, plastic baskets with solid bottoms, children's divider trays, coated paper and plastic plates, china/porcelain bowls and plates.

The suction device may be clear, translucent, opaque, or any desired color.

Suction devices vary depending on the material of which they are composed and their exact structure, and as such have varying degrees of holding strength. The holding strength of the suction device should be such that the attached dish or article is securely retained. Many suction devices include a small extension at the outer edge of the suction part, allowing for easy removal of the attached dish or article. To provide a sanitary and attractive surface, suction devices can be washed and cleaned and can also be easily replaced if necessary, at very little cost.

The suction cup with the tab is designed so that the tab sits up off of the edge of the suction cup so that it doesn't compromise the seal. So the seal edge of the suction cup for the plate can be opposite of the tab release lever and is actually raised slightly off of that edge.

The plate holder can include a suction cup receiving member (e.g., a base or flat piece capable of receiving two or more suction cups that point in opposite directions) that holds the suction cups on each side, herein referred to as the base. The base may be circular, triangular, polygonal, or other various shapes. The base can be made of durable material, such as silicone, unbreakable plastic, metal, or of metal with a plastic coating, which can be rigid or flexible with elasticity to return to its original shape.

The base can measure as follows: the height of the outer edge of the base can be approximately 0.025 inches to 2 inches, more preferably from about 0.05 to 1 inch, and most preferably around 0.05 to about 0.75 inches. The length and width, or diameter, of the base can measure approximately 1 inch to 8 inches, more preferably from 2 to 6 inches, and most preferably about 3 inches (from end to end). The top center of the base can be concave to receive the concave skirt. The topside of the base can include a suction cup receiving member, and when only one large suction cup is used the suction cup receiving member can be located at the center of the base. The receiving member can be a hole, slot, or the like for receiving a suction cup.

On the underside of the base are one or more receiving members for receiving one or more suction cups which secure the entire structure to a flat table or other substrate. These suction cups can be arranged pointing downwards toward the table or other substrate and situated on the base in an equidistant pattern for stability of the plate. The materials used for the suction cups would be silicone, rubber or standard suction cup materials, and can prevent damage to the table or other substrate finish. The base can receive the suction cups by sliding or fastening the protrusion (e.g., stem) of the suction device through the divot or notch or hole of the base.

In one embodiment, the plate holder can include a slip-resistant member at one or more locations. The slip-resistant member can be any friction decreasing member or padding. The slip resistant member can be located on the plate holder at any position that contacts the plate and/or table or other substrate. However, the suction cup does not include a slip-resistant member.

In one embodiment, all parts of the plate holder may be made of materials that are safe for contact with food such as FDA approved plastic or other safe materials The plate holder can include writing or other graphics on any portion of the plate holder. For example, the skirt can be fabricated to include writing or graphics related to the source or origin. The writing or graphics can be incorporated directly into the plate holder, by laser engraving, molding, or other permanent processes, and is durable and generally unaffected by repeated use and cleaning. Any desired type of writing, graphics or indicia may be incorporated.

The plate holder provide numerous advantages over prior art. The plate holder firmly attaches a dish or article to a table or structure so that it is not easily removed or upset by a child or by movement due to wind or movement of the structure. The ability to use all types of dishes eliminates the trouble of cleaning the dish after the meal and the unsanitary practice of carrying home a dirty dish or tray.

The method of manufacturing the plate holder can use molding to precisely form each component provides a simple but effective way to produce the plate holder. The plate holder may be easily and economically assembled and disassembled for convenient transportation and storage. The plate holder is easily attached and removed by an adult but is not easily removed by a child or by wind or movement of the structure to which it is attached. The plate holder can be safely manufactured and used and is made of durable materials that maintain proper function over repeated use and cleaning. The method of manufacturing the plate holder is effective and relatively simple and inexpensive.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. All references recited herein are incorporated by specific reference in their entirety.

The invention claimed is:

1. A plate holder comprising:
   a skirt having a top member and one or more side walls forming a cavity therebetween when the one or more side walls are resting on a substrate with the top member oriented away from the substrate;

a base coupled with the skirt and located within the cavity, the base having one or more top suction device receptacles and one or more bottom suction device receptacles;

one or more top suction devices coupled with the one or more top suction device receptacles such that the top suction device is oriented away from the substrate; and one or more bottom suction devices coupled with the one or more bottom suction device receptacles such that the bottom suction device is oriented toward the substrate.

2. The plate holder of claim 1, the top and bottom suction device receptacles being configured for removably receiving suction devices.

3. The plate holder of claim 1, the one or more top or bottom suction devices including a stem configured for removably coupling with the base.

4. The plate holder of claim 1, wherein the skirt is removably coupled to the base through one or more top suction devices.

5. The plate holder of claim 1, wherein the skirt includes one or more access ports.

6. The plate holder of claim 1, wherein one or more of the suction devices has an elongate release tab.

7. The plate holder of claim 1, further comprising a groove formed into the top member of the skirt in a radial orientation.

8. The plate holder of claim 1, further comprising a top surface of the top member having a recess configured for receiving the one or more top suction cups such that a dinnerware rests on the top member when attached to the one or more top suction cups.

9. The plate holder of claim 1, the base including a structural reinforcement member.

10. The plate holder of claim 1, wherein the skirt includes an aperture configured for receiving a stem of the suction device therethrough so as to couple the skirt to the base.

11. The plate holder of claim 1, comprising:
a recess in the skirt;
an aperture at a bottom portion of the recess;
the base having one top suction device receptacle and two or more bottom suction device receptacles;
two or more bottom suction devices removably coupled with the two or more bottom suction device receptacles; and
one top suction device having a stem that extends through the aperture and is removably coupled with the top suction device receptacle.

12. A method of releasably securing kitchenware to a substrate, the method comprising:
providing a plate holder comprising:
a skirt having a top member and one or more side walls forming a cavity therebetween when the one or more side walls are resting on a substrate with the top member oriented away from the substrate;
a base coupled with the skirt and located within the cavity, the base having one or more top suction device receptacles and one or more bottom suction device receptacles;
one or more top suction devices coupled with the one or more top suction device receptacles such that the top suction device is oriented away from the substrate; and
one or more bottom suction devices coupled with the one or more bottom suction device receptacles such that the bottom suction device is oriented toward the substrate;
attaching the plate holder by suction of the one or more bottom suction devices to a substrate; and
attaching the plate holder by suction of the one or more top suction devices to a kitchenware.

13. The method of claim 12, the providing including assembling the plate holder.

14. The method of claim 13, the assembling including one or more of:
inserting a stem of a top suction cup through an aperture in the skirt;
coupling the stem of a top suction device with a top suction device receptacle of the base; or
coupling the stems of bottom suction devices with bottom suction device receptacles of the base.

15. The method of claim 12, the plate holder being in a ready to use configuration upon being provided.

16. The method of claim 15, comprising retrieving the plate holder in the ready to use configuration from a bag.

17. The method of claim 12, further comprising releasing the seal between a top suction device and the kitchenware and/or between a bottom suction device and the substrate.

18. The method of claim 12, further comprising rotating the skirt such that an access port of the skirt is positioned opposite of a subject.

19. A plate holder kit comprising:
a skirt having a top member with a recess and one or more side walls forming a cavity therebetween when the one or more side walls are resting on a substrate with the top member oriented away from the substrate, the skirt having an aperture in the recess;
a base having one or more top suction device receptacles and one or more bottom suction device receptacles;
one or more top suction devices having a stem configured to be passed through the aperture of the skirt and to be removably coupled with the one or more top suction device receptacles such that the top suction device is oriented away from the substrate; and
one or more bottom suction devices configured to be removably coupled with the one or more bottom suction device receptacles such that the bottom suction device is oriented toward the substrate.

20. The kit of claim 19, comprising one or more of the following:
a single top suction device;
two or more bottom suction devices;
one or more access ports formed in the top member;
one or more top suction devices including an elongate release tab;
the one or more suction device receptacles being equally spaced apart;
a groove in the top member configured for receiving an elongate release tab of a suction device;
the base having a structural reinforcing member; or
the suction device receptacles being holes having a large portion that can receive a suction device stem and a small portion that can snap onto the suction device stem.

* * * * *